May 19, 1959          C. S. STRONG          2,887,040
WASTE RECEPTACLE WITH AUTOMATIC TAMPER
Filed Oct. 11, 1954          2 Sheets-Sheet 1
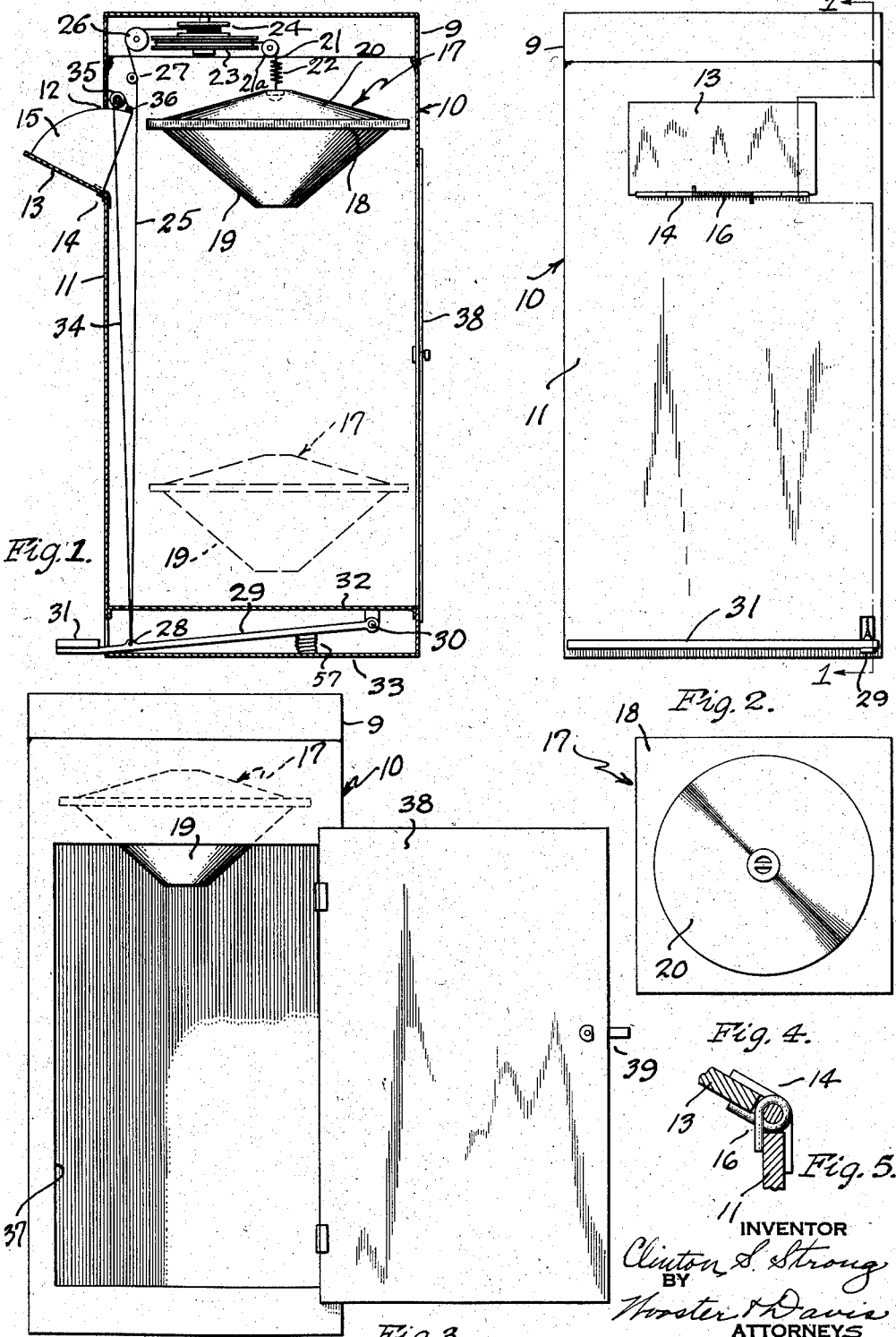
INVENTOR
Clinton S. Strong
BY
Worster & Davis
ATTORNEYS May 19, 1959   C. S. STRONG   2,887,040
WASTE RECEPTACLE WITH AUTOMATIC TAMPER
Filed Oct. 11, 1954   2 Sheets-Sheet 2

INVENTOR
Clinton S. Strong
BY
Wooster & Davis
ATTORNEYS.

United States Patent Office 2,887,040
Patented May 19, 1959

2,887,040

WASTE RECEPTACLE WITH AUTOMATIC TAMPER

Clinton S. Strong, Stratford, Conn., assignor to Technical Design and Development Company, Incorporated, Devon, Conn., a corporation of Connecticut Application October 11, 1954, Serial No. 461,311

10 Claims. (Cl. 100—265)

This invention relates to a receptacle for waste paper, and particularly to a receptacle for loose waste paper, such, for example, as used paper towels and the like, and has for an object to provide a receptacle for this purpose including a container for the waste paper provided with an automatically operating tamping means for tamping and compressing the loose waste paper after it is placed in the container to materially reduce its volume, or that is, the space which it occupies in the container, and therefore to greatly increase the capacity of the receptacle and increase the time between the periods at which it is necessary to empty the container.

It is also an object to provide a device of this character with an improved automatically operating tamping means for the loose waste paper.

Another object is to provide a receptacle for loose waste paper in which a closure for an opening through which waste paper may be placed in the container, and the tamper for tamping the paper, are operated in proper timed relation by means exterior of the container, such, for example, as a foot treadle or a hand lever.

With the foregoing and other objects in view, I have devised the construction illustrated in the accompanying drawing forming a part of this specification. It is, however, to be understood the invention is not limited to the specific details of construction and arrangement shown but may embody various changes and modifications within the scope of the invention.

In this drawing:

Fig. 1 is a vertical section of this improved receptacle taken substantially on line 1—1 of Fig. 2;

Fig. 2 is a front view of the device;

Fig. 3 is a rear view with the door for the opening through which the papers or a receptacle containing these papers may be removed shown in the open position;

Fig. 4 is a top plan view of the tamper;

Fig. 5 is a sectional view illustrating a form of hinge which may be used for the closure of the entrance opening;

Figure 6:
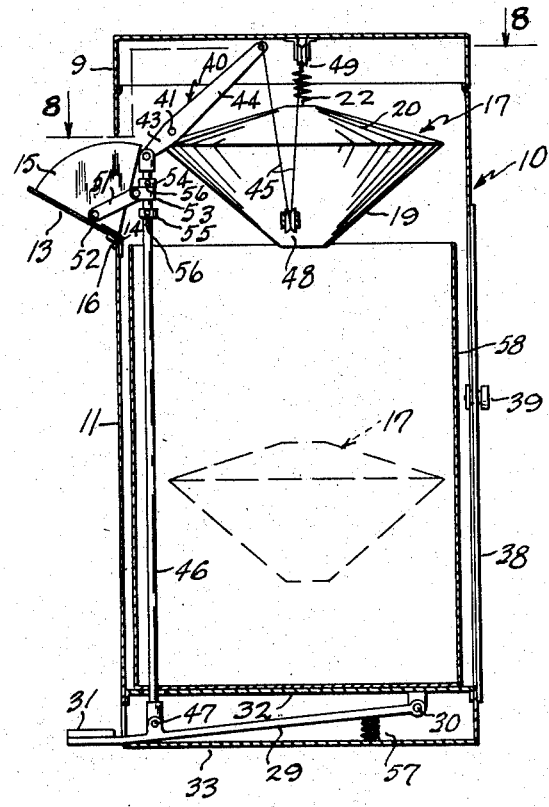
Fig. 6 is a section similar to Fig. 1 showing a modified arrangement.

In the ordinary waste paper receptacle or container, particularly those used for waste paper towels and the like, they are placed in the container in a loose, open condition and consequently the container is soon filled with this material, and the contents must be removed at short intervals. In this device, means is provided for automatically tamping down the loose papers so that it will hold much more before it needs to be emptied.

The device shown comprises an upright holder or container 10 which may be a casing either closed at the top as a part of the casing structure, or have a separable removable cover 9 if desired, and in one wall, preferably the front side wall 11, it is provided adjacent the top of the container with an entrance opening 12 normally closed by a suitable hinged closure 13, which is spring-loaded so that it automatically returns to and is retained in the closed position when released after being opened. The particular closure shown is hinged at its lower edge, as indicated at 14, so that its upper edge will swing outwardly, and it may have curved end walls 15 so that the closure and these walls form a chute to direct the waste paper material into the container. The spring for closing the container in the arrangement shown is incorporated in the hinge, as indicated at 16, and is so loaded as to tend to shift the closure to the closed position and retain it in this position.

Within the container is means for automatically tamping the loose papers to reduce their volume. This comprises a vertically movable tamper 17 which may take various shapes. The preferred shape is a tapered or substantially cone-shaped lower surface, as shown at 19, and it may or may not include a square, or rectangular, or circular plate 18 depending on how it is used or the shape of the container. The inverted conical shape 19 provides a tapered tamping surface which is very effective for this purpose. The upper portion may also be substantially conical shaped, as indicated at 20. This tamper is formed of material which has considerable weight or sufficient weight to have the desired tamping effect when released or dropped from its position in the upper part of the container. It therefore comprises a weighted tamper with an inverted conical or tapered lower surface for an improved tamping effect.

This tamper is suspended by a suitable suspending means connected to the top of the tamper and operable by some operating means located outside the container. In the form shown in Fig. 1 it comprises a flexible cable 21 connected through an extensible spring 22 to the top of the tamper. That is, the lower end of the spring is connected to the tamper and the cable is connected to the upper end of the spring so that the tamper is suspended through this spring, which preferably forms the sole connection between the tamper and the suspending cable. This spring allows the tamper to oscillate up and down adding a further tamping effect. This cable 21 is connected to and may be wound around a larger grooved pulley 23 after passing over a guide sheave 21a. To pulley 23 is also connected a smaller grooved pulley 24. Connected to this latter pulley, and which may be wound on it, is another flexible cable 25 running over the guide sheaves 26 and 27, and it is connected at its lower end 28 to a lever 29 pivoted at 30 and operable by a foot treadle 31 connected to the front end thereof, and preferably extending across the front of the receptacle at the lower part thereof, as shown in Figs. 1 and 2. The container is preferably provided with a bottom wall 32 spaced above the bottom wall 33 of the casing or receptacle, providing a space in which the lever 29 may be located and contained so it is out of the way.

The closure 13 in Fig. 1 for the entrance opening is operated to the open position by another flexible cable 34 also connected to the lever 29 and passing over a guide sheave or pulley 35 and connected to the inner end of one of the end walls 12 as shown at 36. It will therefore be seen that the tamper 17 is connected to the foot-operated lever 29 through a motion-increasing or step-up device comprising the two pulleys 23 and 24, of different diameters so that a relatively small movement of the lever will impart sufficient lifting movement to the tamper to shift it from its lower dotted position at the lower part of the container to its full line position at the upper part of the container and sufficiently above the entrance opening 12 to permit the placing of the loose waste paper towels and like material into the container beneath the tamper 17.

In operation, the user steps on the treadle 31 forcing it downwardly. This operates the lever 29 which through the flexible cable 34 opens the door or closure 13 against the action of the spring 16, and also this operation of the lever will draw downwardly on the cable 25 and through the step-up motion produced by the pulleys 24 and 23 will raise the tamper 17 to a position as shown in full lines, Fig. 1, above the opening 12, or to a position in which there is sufficient space under the tamper to permit passage of the loose waste paper through the opening into the container beneath the tamper. The weight of the tamper stresses and stretches the spring 22 and the spring also allows the tamper to oscillate up and down. Then as the operator removes his foot from the tradle 31 this automatically releases the closure 13 and the tamper 17 so that the door is closed by the preloaded spring 16 and the weighted tamper 17 drops, tamping down the loose papers beneath it. This tamping action is increased by the tamper oscillating up and down due to its spring suspension, and also by the tapered lower portion 19 of the tamper. It will be seen that because of this taper the surface which first engages the loose paper is relatively small and the surface engaging the paper therefore gradually increases as the tamper continues to move downwardly, thus increasing the tamping surface. This shape therefore gives a much more effective tamping action and therefore tamps the papers to a smaller volume. Furthermore, as the tamper is connected by the extensible spring 22 to the suspending cable 21 it is suspended by this spring which thus becomes stressed and stretched, and this permits and causes the tamper to move or oscillate up and down, automatically giving a further tamping effect on the papers. The device is thus automatic, as stepping on the treadle opens the inlet door and raises the tamper to its upper position and also stresses the spring, and release of the treadle permits the door to be closed automatically and the tamper to drop of its own weight and oscillate up and down to effectively perform the tamping operation of tamping the papers into a small space.

Other forms of means may be provided for suspending and lifting the tamper and operating the closure. A modified form and arrangement is shown by way of example in Figs. 6 to 8. In this form a lever 40 is pivoted at 41 to one side 42 of the holder or casing 10, the pivot 41 being so located as to provide a relatively short arm 43 and a longer arm 44 to give a greater movement to a flexible cable 45 connected to this arm than is required by a connecting rod 46 connecting the arm 43 with the foot treadle 31 and lever 29 at 47. The flexible cable passes from lever 40 over guide rollers or sheaves 48, 49 and 50, it is suspended from sheave 50 and is connected to the upper end of spring 22 supporting the tamper 17.

A difference means is also provided in this arrangement for operating the door or closure 13. This as shown comprises a door operating link 51 pivoted to the door at 52 and at its other end to a collar 53 slidable on the push rod 46. Adjustable collars 54 and 55 are secured on rod 46 above and below collar 53 and may be secured in different adjusted positions on this rod by any suitable means, such as set screws 56.

With this arrangement, when the lever 29 is depressed the push rod 46 is actuated down and collar 54 will engage the slidable collar 53 and shift the door to the open position shown. This action of rod 46 will also depress the short arm 43 of lever 40 and raise long arm 44 which through the flexible cable 45 will raise the tamper 17 to its upper full line position of Figs. 6 and 7.

When the foot pedal is released this lever and the push rod will return to their original positions, and as the rod moves upward the collar 55 will engage the collar 53 and close door 13. This action may also be assisted by a spring as in the form of Fig. 1, such as a spring 16 on the hinge for the door, or the collar 55 could be omitted and the spring 16 alone relied on to close the door. Release of the pedal 31 will also permit the tamper 17 to drop, and as it is suspended by the spring 22 the same as the first form it will operate in the same way and will oscillate up and down to automatically tamp the papers in the holder under this tamper. An additional spring 57 could be provided to assist in returning lever 29 and pedal 21 to the raised or normal position.

Figure 7:
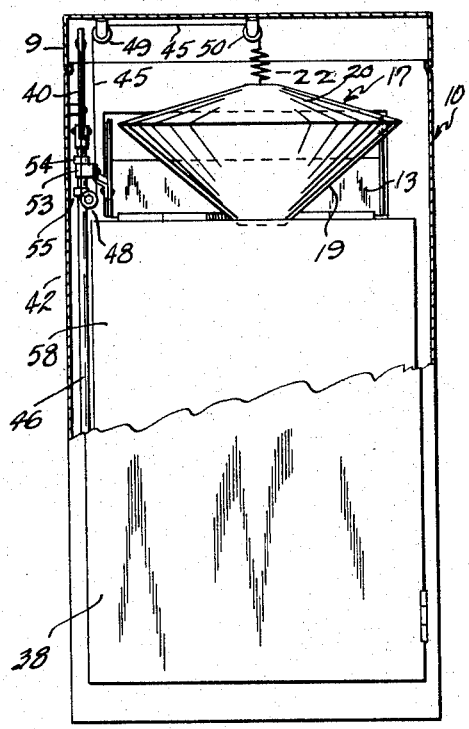
Fig. 7 is a partial rear view and a partial vertical section with the upper portion of the rear wall removed and looking from the right of Fig. 6.
Figure 8:
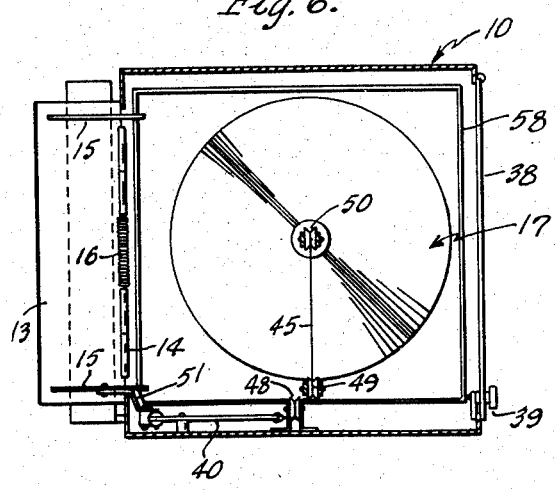
Fig. 8 is a transverse section substantially on line 8—8 of Fig. 6.

Suitable means is provided to permit removal of the tamped papers when the container becomes filled with them to a given height. In the device shown, there is a removal opening 37 in the rear wall of the container closed by a hinged door 38 having a suitable catch 39. Papers may be readily removed after opening the door, or if preferred, a separate removable container 58 could be used, as shown in Figs. 6 to 8, and placed in the lower part of the casing to receive the loose papers and have them tamped in it, and then when filled be removed through this rear opening as a filled package. This removable container could be in different forms, such, for example, as a canvas bag, or a sheet material container.

It will be understood from the above that the operation of this device is a very simple one and does not involve any more operations than is required with the usual container. That is, it is operable by the single simple operation of the foot treadle 31 which opens the entrance closure and prepares the device to receive the waste paper towels and similar articles, and then when the foot treadle is released the loose papers are automatically effectively tamped to a more compressed condition requiring much reduced space, without any further operations being required by the user of the device.

Having thus set forth the nature of my invention, I claim:

1. A waste paper receptacle comprising a container provided with an entrance opening in a side wall adjacent the top thereof, a vertically movable weighted tamper in the container, means for suspending the tamper comprising an extensible spring connected at its lower end to the tamper, and means connected to the upper end of the spring for suspending the tamper within the container above the bottom thereof and raising it in the container to the upper part thereof to permit placing loose waste paper through said opening into the container under the tamper, the spring forming the sole support for the tamper with a free suspension so that when the tamper is released after being raised to its upper position it falls of its own weight and its momentum tensions the spring and it then reciprocates up and down under action of the spring and its own weight to tamp the loose papers in the container.

2. A waste paper receptacle comprising a container provided with an entrance opening for waste paper at the upper part thereof, a vertically movable weighted tamper in the container, means for suspending the tamper above the bottom of the container including an extensible spring connected at its lower end to the tamper and a lifting and supporting means connected to the upper end of the spring, and means outside the container for operating said lifting and supporting means to lift the tamper to the upper part of the container to permit placing of loose waste paper under the tamper and then releasing it to permit it to drop and tamp the paper, the spring forming the sole support for the tamper with a free suspension so that when the tamper is released after being raised to its upper position it falls of its own weight and its momentum tensions the spring and it then reciprocates up and down under action of the spring and its own weight to tamp the loose papers in the container.

3. A waste paper receptacle comprising a container provided with an entrance opening for waste paper at the upper part thereof, a vertically movable weighted tamper in the container comprising an inverted conically shaped tamping surface on its lower side, means for suspending the tamper above the bottom of the container including an extensible spring connected at its lower end to the tamper and a lifting and supporting means connected to the upper end of the spring, and operating means outside the container to draw the lifting and supporting means upwardly to shift the tamper to the upper part of the container to permit placing of loose waste paper under the tamper and then releasing the tamper to permit it to drop and tamp the paper, the spring forming the sole support for the tamper with a free suspension so that when the tamper is released after being raised to its upper position it falls of its own weight and its momentum tensions the spring and it then reciprocates up and down under action of the spring and its own weight to tamp the loose papers in the container.

4. A waste paper receptacle comprising an upright container provided with an entrance opening in one side wall adjacent the top, a spring loaded closure for said opening tending to move to the closed position, a vertically movable weighted tamper in the container, a spring supporting the tamper above the bottom of the container, a foot treadle at the lower part of the receptacle, and flexible cables connecting the treadle to the closure and the tamper supporting spring arranged to open the closure and raise the tamper to the upper part of the container on depression of the treadle, said tamper supporting spring forming the sole support for the tamper with a free suspension so that when the tamper is released after being raised to its upper position it falls of its own weight and its momentum tensions the spring and it then reciprocates up and down under action of the spring and its own weight to tamp the loose papers in the container.

5. A waste paper receptacle comprising an upright container provided with an entrance opening in one side wall adjacent the top, a spring loaded closure for said opening tending to move to the closed position, a vertically movable weighted tamper in the container, a foot treadle at the lower part of the receptacle, a flexible cable connecting the treadle to the closure, a spring supporting the tamper above the bottom of the container, a flexible cable connected to the tamper through said latter spring, and guide means for the cables so arranged that depression of the treadle opens the closure and shifts the tamper to the upper part of the container, said tamper supporting spring forming the sole support for the tamper with a free suspension so that when the tamper is released after being raised to its upper position it falls of its own weight and its momentum tensions the spring and it then reciprocates up and down under action of the spring and its own weight to tamp the loose papers in the container.

6. A waste paper receptacle comprising an upright container, a vertically movable weighted tamper in the container having an inverted conically shaped tamping surface on its under side, a foot treadle at the lower part of the receptacle, a spring connected to the tamper supporting it above the bottom of the container, and a flexible cable connected to the upper end of the spring to suspend the tamper and so connected to the treadle that depression of the treadle will lift the tamper to the upper part of the container, the spring forming the sole support for the tamper with a free suspension so that when the tamper is released after being raised to its upper position it falls of its own weight and its momentum tensions the spring and it then reciprocates up and down under action of the spring and its own weight to tamp the loose papers in the container.

7. A waste paper receptacle comprising an upright container provided with an entrance opening in one side wall adjacent the top, a spring loaded closure for said opening tending to move to the closed position, a vertically movable weighted tamper in the container having an inverted conically shaped tamping surface on its lower side, a foot treadle at the lower part of the receptacle, operating means connecting the treadle to the closure to open it on depression of the treadle, a flexible cable connected to the tamper through a spring so that the tamper is suspended by the cable through the spring, said cable and spring being of a length to support the tamper above the bottom of the container, means connecting the cable to the treadle, and guide means for the cable so arranged that depression of the treadle will lift the tamper through the spring to the upper part of the container, the spring forming the sole support for the tamper with a free suspension so that when the tamper is released after being raised to its upper position it falls of its own weight and its momentum tensions the spring and it then reciprocates up and down under action of the spring and its own weight to tamp the loose papers in the container.

8. A waste paper receptacle according to claim 2 in which there is a movable closure for said opening, and the operating means for the tamper lifting and supporting means comprises a foot treadle at the lower part of the receptacle, and means connecting the treadle to the closure and tamper supporting spring arranged to open the closure and raise the tamper to the upper part of said container comprising a push rod connected to the treadle, a link connected to the closure, a collar slidable on the rod and connected to the link, a second collar secured on the rod to engage the slidable rod to open the closure, a pivoted lever, means connecting one arm of the lever to the rod, and suspending means connecting the other arm of the lever to the tamper supporting spring.

9. A waste paper receptacle according to claim 2 in which there is a movable closure for said opening, and the means for operating the tamper lifting and supporting means comprises a foot treadle at the lower part of the receptacle, a push rod connected to the treadle, a link connecting the rod to the closure for operating it, a pivoted lever connected at one end to the rod, means connecting the other end of the lever to the tamper supporting spring, and said link and lever so arranged that depression of the treadle opens the closure and shifts the tamper to the upper part of the container.

10. A waste paper receptacle according to claim 2 in which there is a movable closure for said opening, the movable weighted tamper has an inverted conically shaped tamping surface on its lower side, and the means for operating the tamper lifting and supporting means comprises a foot treadle at the lower part of the receptacle, operating means connecting the treadle to the closure to open it on depression of the treadle, a pivoted lever, means connecting one arm of the lever to the treadle, means connecting the other arm of the lever to the tamper through the spring so that the tamper is supported by the lever through the spring, and said lever and connections so arranged that depression of the treadle will lift the tamper through the spring to the upper part of the container.

References Cited in the file of this patent
UNITED STATES PATENTS

| Re. 5,060 | Ertel | Sept. 17, 1872 |
| 653,709 | Stopple | July 17, 1900 |
| 1,337,379 | Zawada | Apr. 20, 1920 |
| 2,622,778 | Poland | Dec. 23, 1952 |

FOREIGN PATENTS

| 907,408 | France | June 25, 1945 |